(12) United States Patent
Anderson et al.

(10) Patent No.: US 7,766,531 B2
(45) Date of Patent: Aug. 3, 2010

(54) EDGE-LIT OPTICAL DISPLAY WITH FLUTED OPTICAL PLATE

(75) Inventors: Susan E. Anderson, Woodbury, MN (US); Mark D. Gehlsen, Eagan, MN (US); James T. Richard, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/277,865

(22) Filed: Mar. 29, 2006

(65) Prior Publication Data

US 2007/0236960 A1 Oct. 11, 2007

(51) Int. Cl.
*G02B 6/00* (2006.01)

(52) U.S. Cl. .................. 362/615; 362/628; 349/62; 349/65

(58) Field of Classification Search ......... 362/615–629, 362/561, 551; 349/61–62, 64–65; 385/125, 385/901
See application file for complete search history.

(56) References Cited

U.S. PATENT DOCUMENTS

| | | | |
|---|---|---|---|
| 2,841,904 A | 7/1958 | Jablon | |
| 3,655,263 A | 4/1972 | Hoffman et al. | |
| 4,415,509 A | 11/1983 | Toyooka et al. | |
| 4,830,899 A * | 5/1989 | Nakahashi et al. | 428/137 |
| 4,904,079 A | 2/1990 | Yoshimura et al. | |
| 4,924,243 A | 5/1990 | Sato et al. | |
| 5,112,722 A | 5/1992 | Tsujino et al. | |
| 5,379,139 A | 1/1995 | Sato et al. | |
| 5,396,350 A | 3/1995 | Beeson et al. | |
| 5,428,468 A * | 6/1995 | Zimmerman et al. | 349/62 |
| 5,751,388 A | 5/1998 | Larson | |
| 5,777,433 A | 7/1998 | Lester et al. | |
| 5,793,456 A | 8/1998 | Broer et al. | |
| 5,813,753 A | 9/1998 | Vriens et al. | |
| 5,825,543 A | 10/1998 | Ouderkirk et al. | |
| 5,867,316 A | 2/1999 | Carlson et al. | |
| 5,882,774 A | 3/1999 | Jonza et al. | |

(Continued)

FOREIGN PATENT DOCUMENTS

CN 1136349 11/1996

(Continued)

OTHER PUBLICATIONS

ASTM methods E903, D1003, E308. et al. as Published in "ASTM Standards on Color Appearance Measurement", Contents, pp. 22-27, 204-230, and 304-312, Third ed., ASTM 1991.

(Continued)

*Primary Examiner*—Jong-Suk (James) Lee
*Assistant Examiner*—Robert J May
(74) *Attorney, Agent, or Firm*—Jay R. Pralle

(57) ABSTRACT

A display system includes a display panel and a backlight disposed behind the display panel. The backlight has a light guide and at least one light source that directs light into an edge of the light guide. The light guide comprises a front layer facing the display panel, a back layer facing away from the display panel, and a plurality of connecting members connecting the front and back layers. The spaces formed between the connecting members and the upper and the first and second layers are referred to as flutes. Light from the light source may propagate along the flutes.

20 Claims, 8 Drawing Sheets

U.S. PATENT DOCUMENTS

| | | | |
|---|---|---|---|
| 6,011,602 A * | 1/2000 | Miyashita et al. | 349/65 |
| 6,086,211 A * | 7/2000 | Ohkawa | 362/620 |
| 6,104,454 A | 8/2000 | Hiyama et al. | |
| 6,122,103 A | 9/2000 | Perkins et al. | |
| 6,153,289 A | 11/2000 | Murray | |
| 6,160,663 A | 12/2000 | Merrill et al. | |
| 6,239,851 B1 | 5/2001 | Hatazawa et al. | |
| 6,282,821 B1 | 9/2001 | Freier et al. | |
| 6,343,865 B1 | 2/2002 | Suzuki | |
| 6,443,583 B1 * | 9/2002 | Ha | 362/608 |
| 6,572,961 B1 | 6/2003 | Koyama et al. | |
| 6,613,819 B2 | 9/2003 | Johnson et al. | |
| 6,636,363 B2 | 10/2003 | Kaminsky et al. | |
| 6,642,974 B2 | 11/2003 | Liao | |
| 6,642,977 B2 | 11/2003 | Kotchick et al. | |
| 6,706,339 B1 | 3/2004 | Miyatake et al. | |
| 6,723,392 B1 | 4/2004 | Jinnai et al. | |
| 6,780,355 B2 | 8/2004 | Kretman et al. | |
| 6,842,204 B1 | 1/2005 | Johnson | |
| 6,846,089 B2 | 1/2005 | Stevenson et al. | |
| 6,867,829 B2 | 3/2005 | Chiou | |
| 6,917,399 B2 | 7/2005 | Pokorny et al. | |
| 7,010,212 B2 * | 3/2006 | Emmons et al. | 385/146 |
| 7,118,265 B2 | 10/2006 | Cho | |
| 7,125,157 B2 | 10/2006 | Fu et al. | |
| 7,165,856 B2 * | 1/2007 | Tseng et al. | 362/26 |
| 7,224,416 B2 | 5/2007 | Cha et al. | |
| 7,537,369 B2 * | 5/2009 | Takata | 362/606 |
| 2001/0008681 A1 | 7/2001 | Savant | |
| 2002/0149712 A1 | 10/2002 | Kitamura et al. | |
| 2003/0016205 A1 | 1/2003 | Kawabata et al. | |
| 2003/0017281 A1 | 1/2003 | Mizutani et al. | |
| 2003/0223216 A1 | 12/2003 | Emmons et al. | |
| 2003/0227768 A1 * | 12/2003 | Hara et al. | 362/31 |
| 2004/0062040 A1 | 4/2004 | Blume et al. | |
| 2004/0085749 A1 | 5/2004 | Parker et al. | |
| 2004/0141103 A1 | 7/2004 | Kotchick et al. | |
| 2004/0207995 A1 | 10/2004 | Park et al. | |
| 2004/0228106 A1 | 11/2004 | Stevenson et al. | |
| 2004/0229059 A1 | 11/2004 | Kausch et al. | |
| 2005/0046767 A1 | 3/2005 | Freking et al. | |
| 2005/0117323 A1 | 6/2005 | King | |
| 2005/0184970 A1 | 8/2005 | Wegert et al. | |
| 2005/0259195 A1 | 11/2005 | Koganezawa | |
| 2006/0221611 A1 | 10/2006 | Noh et al. | |
| 2006/0268571 A1 | 11/2006 | Harada et al. | |
| 2007/0047261 A1 | 3/2007 | Thompson et al. | |

FOREIGN PATENT DOCUMENTS

| | | |
|---|---|---|
| EP | 1 164 566 | 12/2001 |
| JP | 63-118718 | 5/1988 |
| JP | 2001-125111 | 5/2001 |
| KR | 10-2005-0058104 | 6/2005 |
| RU | 2178588 | 1/2002 |
| WO | WO 95/12782 | 5/1995 |
| WO | 99/56158 | 11/1999 |
| WO | 03/034104 | 4/2003 |

OTHER PUBLICATIONS

U.S. Application entitled "Direct-lit Liquid Crystal Displays with Laminated Diffuser Plates", filed on Oct. 15, 2004, having U.S. Appl. No. 10/966,610.

U.S. Application entitled "Liquid Crystal Displays with Laminated Diffuser Plates", filed on Oct. 6, 2005, having U.S. Appl. No. 11/244,666.

U.S. Application entitled "Composite Diffuser Plates and Direct-lit Liquid Crystal Displays Using Same", filed on Oct. 15, 2004, having U.S. Appl. No. 10/965,937.

U.S. Application entitled "Optical Display with Fluted Optical Plate", filed on Feb. 28, 2006, having U.S. Appl. No. 11/276,442.

U.S. Application entitled "Fluted Optical Plate with Internal Light Sources and Systems Using Same", filed on Mar. 29, 2006, having U.S. Appl. No. 11/277,863.

* cited by examiner

EDGE-LIT OPTICAL DISPLAY WITH FLUTED OPTICAL PLATE

FIELD OF THE INVENTION

The invention relates to optical displays, and more particularly to display systems that are illuminated from behind, such as may be used in LCD monitors and LCD televisions.

BACKGROUND

Liquid crystal displays (LCDs) are optical displays used in devices such as laptop computers, hand-held calculators, digital watches and televisions. Some LCDs include a light source that is located to the side of the display, with a light guide positioned to guide the light from the light source to the back of the LCD panel. As the size of the display is increased, the components become larger also. Furthermore, to prevent warping or other types of physical distortions, the light guide has to be of a minimum thickness relative to its height and width. As the size of the display increases, this means that the light guide also becomes increasingly thick, thus increasing the weight of the display.

SUMMARY OF THE INVENTION

One embodiment of the invention is directed to a display system that includes a display panel and a backlight disposed behind the display panel. The backlight comprises a light guide and at least one light source disposed to direct light into an edge of the light guide. The light guide comprises a front layer facing the display panel, a back layer facing away from the display panel, and a plurality of connecting members connecting the front and back layers.

Another embodiment of the invention is directed to a backlight unit for an optical display. The backlight unit includes at least one light source capable of emitting illumination light, and a light guide having a first edge disposed proximate the at least one light source. The light guide is provided with hollow channels having openings at the first edge that pass through the light guide from the first edge. At least some of the light from the at least one light source enters the channels and reflects within the channels. The light guide is further provided with light extractors for extracting light from the channels through an upper surface of the light guide.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The invention may be more completely understood in consideration of the following detailed description in connection with the accompanying drawings, in which like reference numerals designate like elements, and wherein.

Figure 1:
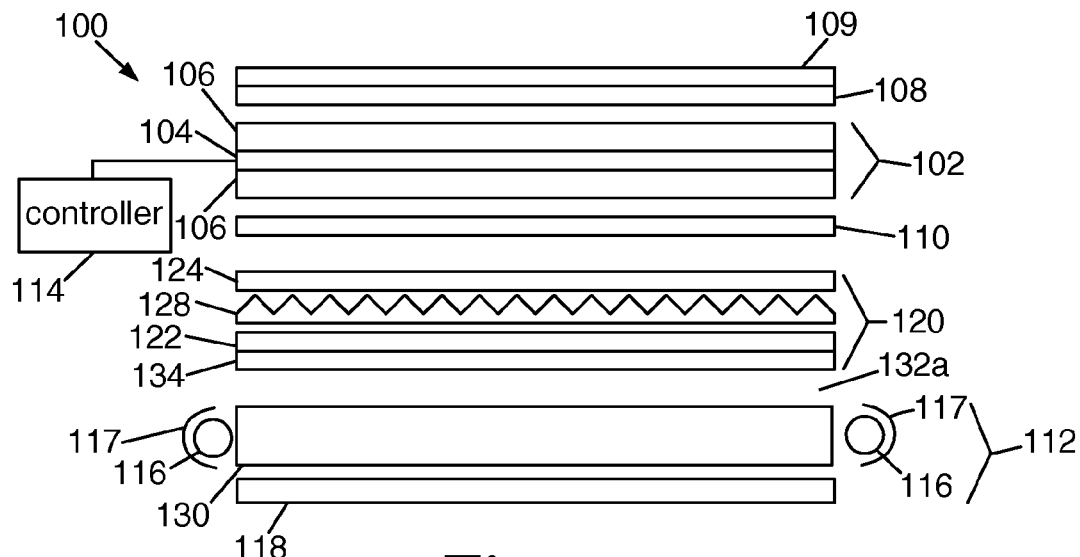
FIG. 1 schematically illustrates a display device that uses a fluted light guide.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives failing within the spirit and scope of the invention as defined by the appended claims.

DETAILED DESCRIPTION

The present invention is applicable to liquid crystal displays (LCDs, or LC displays), and is applicable to LCDs that are edge lit, and that may also be directly illuminated from behind, for example as are used in LCD monitors and LCD televisions (LCD-TVs).

A schematic exploded view of an exemplary edge-lit LC display device 100 is presented in FIG. 1. Such a display device 100 may be used, for example, in an LCD monitor or LCD-TV. The display device 100 is based on the use of an LC panel 102, which typically comprises a layer of LC 104 disposed between panel plates 106. The plates 106 are often formed of glass, and may include electrode structures and alignment layers on their inner surfaces for controlling the orientation of the liquid crystals in the LC layer 104. The electrode structures are commonly arranged so as to define LC panel pixels, areas of the LC layer where the orientation of the liquid crystals can be controlled independently of adjacent areas. A color filter may also be included with one or more of the plates 106 for imposing color on the image displayed.

An upper absorbing polarizer 108 is positioned above the LC layer 104 and a lower absorbing polarizer 110 is positioned below the LC layer 104. In the illustrated embodiment, the upper and lower absorbing polarizers are located outside the LC panel 102. The absorbing polarizers 108, 110 and the LC panel 102 in combination control the transmission of light from the backlight 112 through the display 100 to the viewer. In some LC displays, the absorbing polarizers 108, 110 may be arranged with their transmission axes perpendicular. When a pixel of the LC layer 104 is not activated, it may not change the polarization of light passing therethrough. Accordingly, light that passes through the lower absorbing polarizer 110 is absorbed by the upper absorbing polarizer 108, when the absorbing polarizers 108, 110 are aligned perpendicularly. When the pixel is activated, on the other, hand, the polarization of the light passing therethrough is rotated, so that at least some of the light that is transmitted through the lower absorbing polarizer 110 is also transmitted through the upper absorbing polarizer 108. Selective activation of the different pixels of the LC layer 104, for example by a controller 114, results in the light passing out of the display at certain desired locations, thus forming an image seen by the viewer. The controller may include, for example, a computer or a television controller that receives and displays television images. One or more optional layers 109 may be provided over the upper absorbing polarizer 108, for example to provide mechanical and/or environmental protection to the display surface. In one exemplary embodiment, the layer 109 may include a hardcoat over the absorbing polarizer 108.

Some types of LC displays may operate in a manner different from that described above. For example, the absorbing polarizers may be aligned parallel and the LC panel may rotate the polarization of the light when in an unactivated state. Regardless, the basic structure of such displays remains similar to that described above.

The backlight 112 includes one or more light sources 116 that generate the light that illuminates the LC panel 102. Linear, cold cathode, fluorescent lamps (CCFLs) are commonly used as the light sources 116 in the display device 100. Other types of light sources may be used, however, such as filament or arc lamps, light emitting diodes (LEDs), or lasers. This list of light sources is not intended to be limiting or exhaustive, but only exemplary. In some embodiments different types of light sources may be used in the same display system. For example, a display system may include both CCFLs and LEDs.

The backlight 112 also includes a light guide 130 that guides light from the light sources 116 across the display area, directing at least some of that light upwards towards the LC panel 102. This light guide 130 is discussed further below.

The backlight 112 may also include a reflector 118 for reflecting light propagating downwards in a direction away from the LC panel 102. The reflector 118 may also be useful for recycling light within the display device 100, as is explained below. The reflector 118 may be a specular reflector or may be a diffuse reflector. One example of a specular reflector that may be used as the reflector 118 is Vikuiti™ Enhanced Specular Reflection (ESR) film available from 3M Company, St. Paul, Minn. Examples of suitable diffuse reflectors include polymers, such as polyethylene terephthalate (PET), polycarbonate (PC), polypropylene, polystyrene and the like, loaded with diffusely reflective particles, such as titanium dioxide, barium sulphate, calcium carbonate and the like. Other examples of diffuse reflectors, including microporous materials and fibril-containing materials, are discussed in U.S. Pat. No. 6,780,355 (Kretman et al.), incorporated herein by reference.

An arrangement 120 of light management layers is positioned between the backlight 112 and the LC panel 102. The light management layers affect the light propagating from backlight 112 so as to improve the operation of the display device 100. For example, the arrangement 120 of light management layers may include a diffuser layer 122. The diffuser layer 122 is used to diffuse the light received from the light sources, which results in an increase in the uniformity of the illumination light incident on the LC panel 102. Consequently, this results in an image perceived by the viewer that is more uniformly bright. The diffuser layer 122 may include bulk diffusing particles distributed throughout the layer, or may include one or more surface diffusing structures, or a combination thereof.

The arrangement 120 of light management layers may also include a reflective polarizer 124. The light sources 116 typically produce unpolarized light but the lower absorbing polarizer 110 only transmits a single polarization state, and so about half of the light generated by the light sources 116 is not transmitted through to the LC layer 104. The reflecting polarizer 124, however, may be used to reflect the light that would otherwise be absorbed in the lower absorbing polarizer, and so this light may be recycled by reflection between the reflecting polarizer 124 and the reflector 118. At least some of the light reflected by the reflecting polarizer 124 may be depolarized, and subsequently returned to the reflecting polarizer 124 in a polarization state that is transmitted through the reflecting polarizer 124 and the lower absorbing polarizer 110 to the LC layer 104. In this manner, the reflecting polarizer 124 may be used to increase the fraction of light emitted by the light sources 116 that reaches the LC layer 104, and so the image produced by the display device 100 is brighter. In some exemplary embodiments, a polarization control layer (not shown), such as a birefringent retarding layer, may be positioned below the reflecting polarizer for altering the polarization state of the light reflected by the reflecting polarizer.

Any suitable type of reflective polarizer may be used, for example, multilayer optical film (MOF) reflective polarizers; diffusely reflective polarizing film (DRPF), such as continuous/disperse phase polarizers; wire grid reflective polarizers; or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774 (Jonza et al.), incorporated herein by reference. Commercially available examples of MOF reflective polarizers include Vikuiti™ DBEF-D200 and DBEF-D440 multilayer reflective polarizers that include diffusive surfaces, available from 3M Company, St. Paul, Minn.

Examples of suitable DRPF include continuous/disperse phase reflective polarizers as described in co-owned U.S. Pat. No. 5,825,543 (Ouderkirk et al.), incorporated herein by reference, and diffusely reflecting multilayer polarizers as described in e.g. co-owned U.S. Pat. No. 5,867,316 (Carlson et al.), also incorporated herein by reference. Other suitable types of DRPF are described in U.S. Pat. No. 5,751,388 (Larson).

Some examples of suitable wire grid polarizers include those described in U.S. Pat. No. 6,122,103 (Perkins et al.). Wire grid polarizers are commercially available from, inter alia, Moxtek Inc., Orem, Utah.

Some examples of suitable cholesteric polarizers include those described in, for example, U.S. Pat. No. 5,793,456 (Broer et al.), and U.S. Pat. No. 6,917,399 (Pekorny et al.). Cholesteric polarizers are often provided along with a quarter wave retarding layer on the output side, so that the light transmitted through the cholesteric polarizer is converted to linear polarization.

The arrangement 120 of light management layers may also include one or more brightness enhancing layers 128. A brightness enhancing layer is one that includes a surface structure that redirects off-axis light in a direction closer to the axis of the display. This increases the amount of light propagating on-axis through the LC layer 104, thus increasing the brightness of the image seen by the viewer. One example is a prismatic brightness enhancing layer, which has a number of prismatic ridges that redirect the illumination light, through refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT.

Other types of layers may be used for light management between the backlight and the display unit. Such additional light management layers include gain diffusers and collimating layers, for example layers with lenslet arrays.

Light guide 130 is used in the backlight 112 to lead light from the light sources 116, positioned at the edge of the display, across the display. Advantageously, the light guide 130 can be a fluted plate, or can include a fluted plate, which is a plate that includes flutes, or channels, between the two surfaces of the plate.

An optional turning film, another type of light management layer, may be positioned above the light guide 130 for redirecting light that has passed out of the light guide into a direction more parallel to the axis of the device 100. This type of film typically contains projecting elements that are directed towards the light guide 130. Light 132 from the light guide 130 passes into the projecting element and is totally internally reflected at one of the element surfaces. The apex angles of turning film are generally smaller than the apex angles of a prismatic brightness enhancing film, for example 55°-70° compared with 80°-100°.

One or more support plates 134 may be provided in the arrangement of light management films 120 for supporting the films. The support plates 134 may be solid plates or may be fluted plates, for example as discussed in commonly owned U.S. patent application Ser. No. 11/276,442, "Optical Display with Fluted Optical Plate", filed on Feb. 28, 2006 and incorporated herein by reference. In the illustrated embodiment, the diffuser layer 122 is attached to the support plate 134, although other light management layers may also be attached to the support plate 134.

Figure 2A:
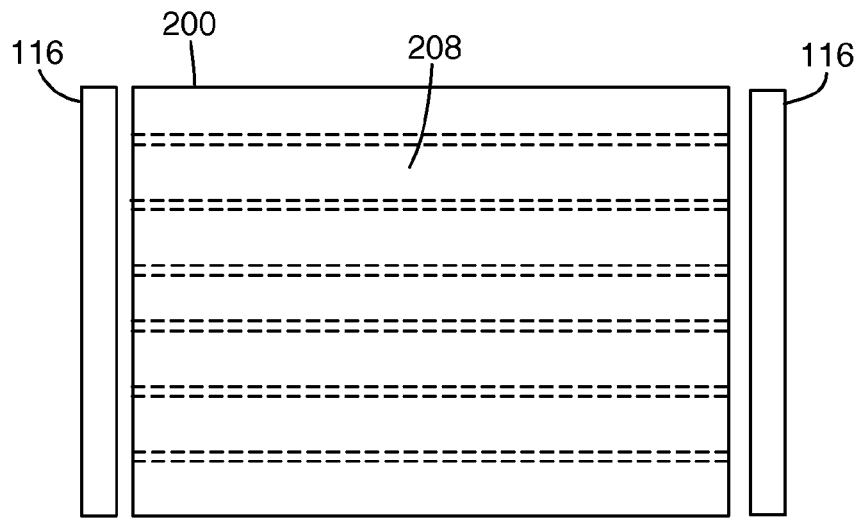
FIG. 2A schematically illustrates a top view of a fluted light guide.
Figure 2B:
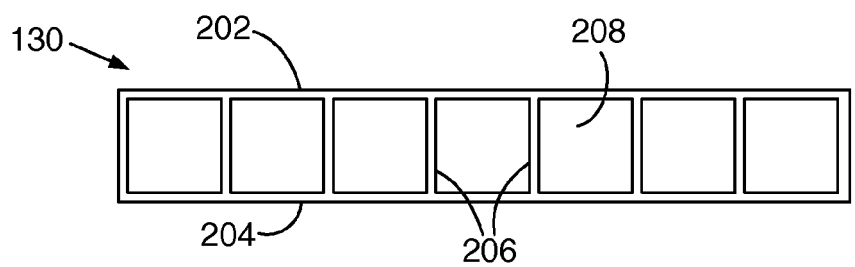
FIG. 2B schematically illustrates a side view of a fluted light guide.

A top view of an exemplary fluted light guide 200 is schematically illustrated in FIG. 2A and a cross-sectional view is schematically illustrated in FIG. 2B. The fluted light guide 200 includes a first layer 202 and a second layer 204, with connecting members 206 connecting the first and second layers 202, 204. The open spaces 208 surrounded by the connecting members 206 and the first and second layers 202, 204 may be considered to be flutes or channels.

A reflector, such as reflector 118, may be provided separate from the fluted light guide 200, or may be attached to the fluted light guide 200. In some embodiments, the second layer 204 of the fluted light guide 200 may be reflective, in which case a separate reflector 118 may be omitted.

The fluted light guide 200 is self-supporting and may, if desired, be used to provide support to other light management layers. The fluted light guide may be made of any suitable material, for example organic materials such as polymers. The fluted light guide may be formed using any suitable method, such as extrusion, molding, or the like.

The thickness of the fluted plate 200 and the size of the flutes 208 may be selected depending on the particular application. For example, the fluted plate may be a few mm thick, for example in the range of approximately 1 mm-4 mm, or may be thicker. The fluted plate 200 may also be thinner, for example having a thickness of approximately 50 µm or more. Also, the center-to-center spacing of the flutes 208 may be selected to be any suitable value. For example, the spacing may be in the range of about 1-4 mm, or greater. In other embodiments, the flute spacing may be less, for example down to around 50 µm or less.

The use of a fluted plate may reduce the weight of a display system such as a notebook, monitor, or TV. In addition, the fluted plate has the mechanical advantages of an "I-beam" with upper and lower plates separated by an air space and a connecting member. Accordingly, the fluted plate provides high resistance to warping and curling under the high illumination conditions typical in many display systems.

The directions of the flutes may be oriented in a desired direction with respect to the light sources. For example, if the light sources are elongated, as with most fluorescent lamps, the flutes may be oriented to be perpendicular to the light sources, as shown in FIG. 2A, or may be oriented at some other angle relative to the light sources. A specific orientation between the light sources and the flutes, for a given design of light source and fluted plate, may provide improved illumination uniformity and also improved thermal response, e.g. warp, curl, and the like.

Suitable polymer materials for the fluted light guide may be amorphous or semi-crystalline, and may include homopolymer, copolymer or blends thereof. Polymer foams may also be used. Example polymer materials include, but are not limited to, amorphous polymers such as poly(carbonate) (PC); poly(styrene) (PS); acrylates, for example acrylic sheets as supplied under the ACRYLITE® brand by Cyro Industries, Rockaway, N.J.; acrylic copolymers such as isooctyl acrylate/acrylic acid; poly(methylmethacrylate) (PMMA); PMMA copolymers; cycloolefins; cylcoolefin copolymers; acrylonitrile butadiene styrene (ABS); styrene acrylonitrile copolymers (SAN); epoxies; poly(vinylcyclohexane); PMMA/poly(vinylfluoride) blends; atactic poly (propylene); poly(phenylene oxide) alloys; styrenic block copolymers; polyimide; polysulfone; poly(vinyl chloride); poly(dimethyl siloxane) (PDMS); polyurethanes; poly(carbonate)/aliphatic PET blends; and semicrystalline polymers such as poly(ethylene) (PE); poly(propylene) (PP); olefin copolymers, such as PP/PE copolymers; poly(ethylene terephthalate) (PET); poly(ethylene naphthalate)(PEN); polyamide; ionomers; vinyl acetate/polyethylene copolymers; cellulose acetate; cellulose acetate butyrate; fluoropolymers; poly(styrene)-poly(ethylene) copolymers; PET and PEN copolymers; and various blends that include one or more of the polymers listed.

Some exemplary embodiments of the fluted light guide 130 include polymer materials that are substantially transparent to light. Some other exemplary embodiments may include extraction features on the fluted light guide 130, for example extraction features that rely on printed extraction patterns or indentations in the light guide or the supporting members between the flutes. The polymer matrix may be any suitable type of polymer that is substantially transparent to visible light, for example any of the polymer materials listed above.

The entire fluted light guide 130 may possess extraction features, or selected portions of the fluted light guide 130 may contain extraction features. For example, the first layer 202, or the second layer 204, may be formed with extraction features while the remainder of the fluted light guide 130 does not. In other embodiments, both the first and second layers 202, 204 may be formed with extraction features. A fluted light guide 130 may perform several functions, such as guiding the light from the light source(s) 116, providing mechanical support for other layers and diffuses and providing an extraction function. The fluted light guide 130 need not perform all of these functions. Extraction features are features that redirect light out of the light guide on a path that leads to the display panel. Examples of such features include areas of the light guide that diffusely reflect or transmit, areas that permit the light to leak out of the light guide to be turned by a subsequent turning film, and the like. The extraction features are often, but do not need to be, located on the surface of the light guide.

Figure 3A:
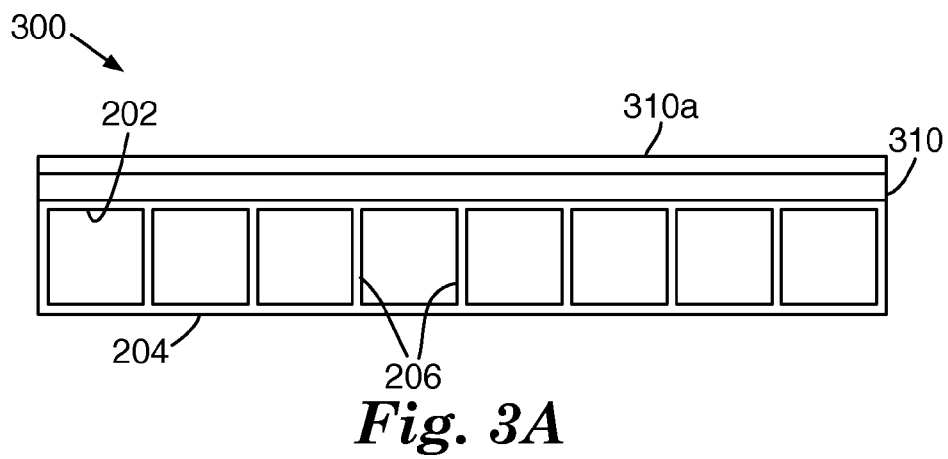
FIGS. 3A and 3B schematically illustrate fluted light guides having attached layers.

In other exemplary embodiments, a fluted light guide 300 may be provided with an extraction layer 310, for example as schematically illustrated in FIG. 3A. The extraction layer 310 may be attached to either the first layer 202 or the second layer 204 of the fluted light guide 300. In addition, in some embodiments, there may be extraction layers attached to each of the first and second layers 202, 204. The extraction layer 210 may be attached to the fluted light guide 300 using an adhesive layer (not shown) or, in other embodiments, the extraction layer 310 may itself be an adhesive layer attached to the fluted light guide 300.

In some exemplary embodiments, the extraction layer 310 has an extraction characteristic that is uniform across its width, in other words the amount of extraction is the same for points across the width of the extraction layer 310. In other embodiments, the extraction characteristic may change across the width of the extraction layer 310.

The fluted light guide may be provided with protection from ultraviolet (UV) light, for example by including UV absorbing material or material that is resistant to the effects of UV light. Suitable UV absorbing compounds are available commercially, including, e.g., Cyasorb™ UV-1164, available from Cytec Technology Corporation of Wilmington, Del., and Tinuvin™ 1577, available from Ciba Specialty Chemicals of Tarrytown, N.Y. The fluted light guide 300 may also include brightness enhancing phosphors that convert UV light into visible light.

Other materials may be included into the layers of the fluted light guide to reduce the adverse effects of UV light. One example of such a material is a hindered amine light stabilizing composition (HALS). Generally, the most useful HALS are those derived from a tetramethyl piperidine, and those that can be considered polymeric tertiary amines. Suitable HALS compositions are available commercially, for example, under the "Tinuvin" tradename from Ciba Specialty Chemicals Corporation of Tarrytown, N.Y. One such useful HALS composition is Tinuvin 622.

Figure 3B:
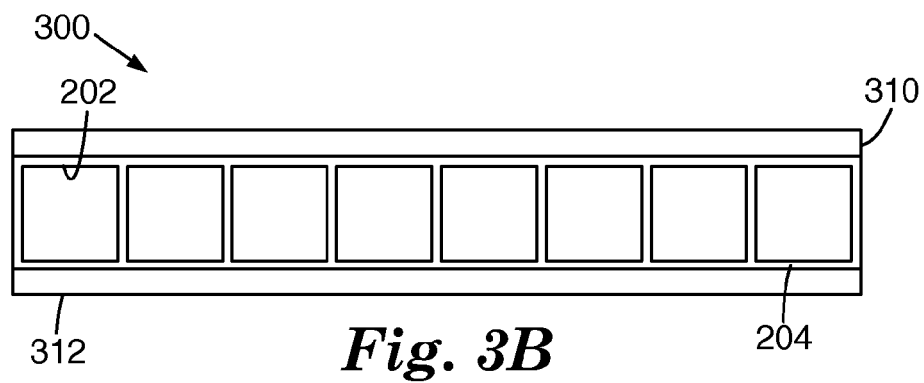

In other embodiments, the fluted light guide may have two extraction layers 310, 312 attached respectively to the first and second layers 202, 204 of the fluted light guide 300. The extraction layers 310, 312 may each be applied directly to the respective layer 202, 204 of the fluted light guide 300, as is illustrated in FIG. 3B, or may be attached using a layer of adhesive (not shown). The two extraction layers 310, 312 may have the same extraction properties, or may have different extraction properties.

The optical properties of the fluted light guide (such as the amount of diffusion, refractive index, or layer thickness) may be uniform or non-uniform across the length and/or width of the light guide, as discussed in previously filed U.S. patent application Ser. No. 11/276,442, referenced above.

The surfaces of the material surrounding the spaces or flutes may be parallel or perpendicular to the outer surfaces of the fluted light guide, but this is not necessary. In some embodiments, the surfaces of the first or second layer defining the flutes may be non-parallel to the upper surface of the fluted light guide. Likewise, the lower surface of the flute may also be non-parallel to the lower surface of the second layer.

Figure 4A:
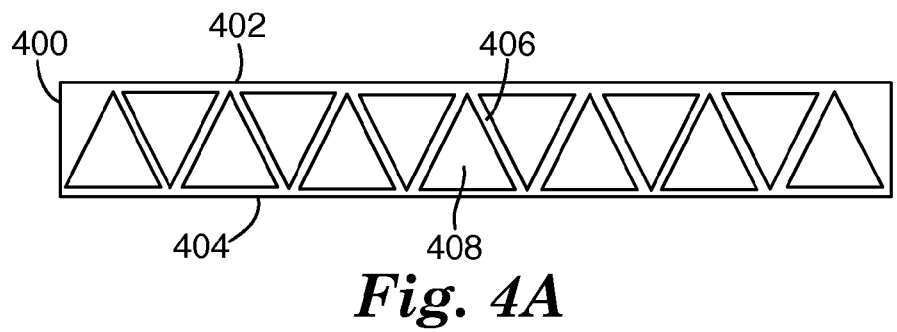
FIGS. 4A and 4B schematically illustrate fluted light guides having flutes of different cross-sectional shape.
Figure 4B:
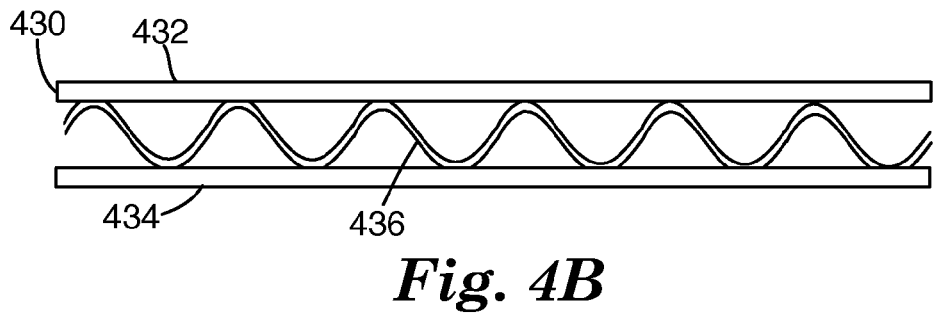

The flutes need not be quadrilateral in shape, and may take on other shapes. For example, in one exemplary embodiment schematically illustrated in FIG. 4A, the fluted light guide 400 has angled connecting members 406 connecting the first and second layers 402, 404. Consequently, the flutes 408 have a triangular cross-section. In another exemplary embodiment, schematically illustrated in FIG. 4B, the fluted light guide 430 has upper and lower layers 432, 434 that are connected together via curved connecting members 436. In the illustrated embodiment, the curved connecting members 436 alternate between curving in one direction and the opposite direction, to produce a corrugated effect.

Many different cross-sections may be used for the connecting members and the flutes, in addition to those illustrated herein. The illustrated embodiments are presented for purposes of illustration only and that there is no intention to limit the scope of the invention only to those cross-sections illustrated herein.

Figure 5:
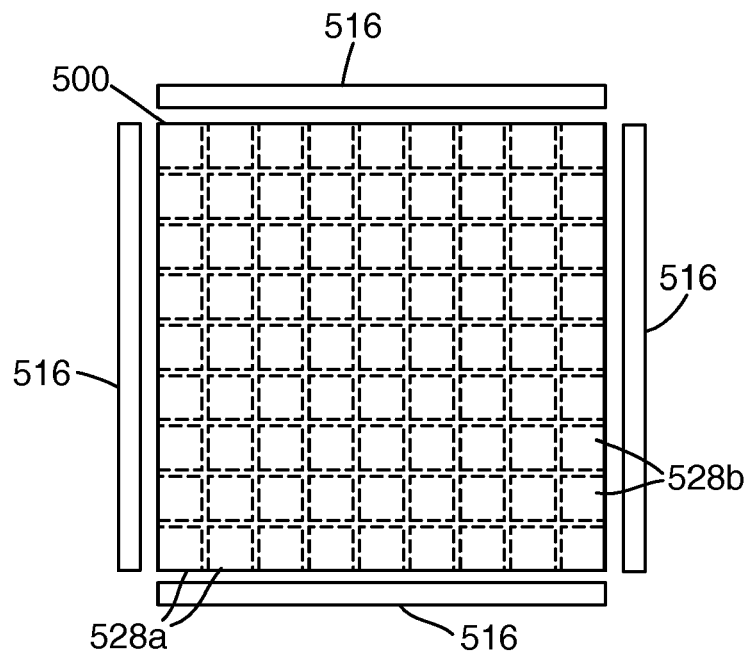
FIG. 5 schematically illustrates a top view of another fluted light guide.

In some exemplary embodiments, for example the fluted light guide 200 of FIG. 2A, the flutes are linear and arranged parallel to each other. In other embodiments, for example the fluted light guide 500 of FIG. 5, the flutes are linear but are arranged with a first group of flutes 528a parallel to each other and a second group of flutes 528b parallel to each other but perpendicular to the first group. In other embodiments, different flutes may lie at different angles to each other. Light sources 516 may be positioned along one or more edges of the fluted light guide. The flutes may be oriented to be perpendicular or parallel to the major axis of the light source, if the light source has a major axis. In the case of a CCFL for example, the major axis is the longitudinal axis parallel to the extended direction of the lamp. The flutes may also be oriented at any other angle in between the parallel and perpendicular orientations. In the illustrated embodiment of FIG. 5, light sources are positioned along all four edges of the fluted light guide.

Figure 6A:
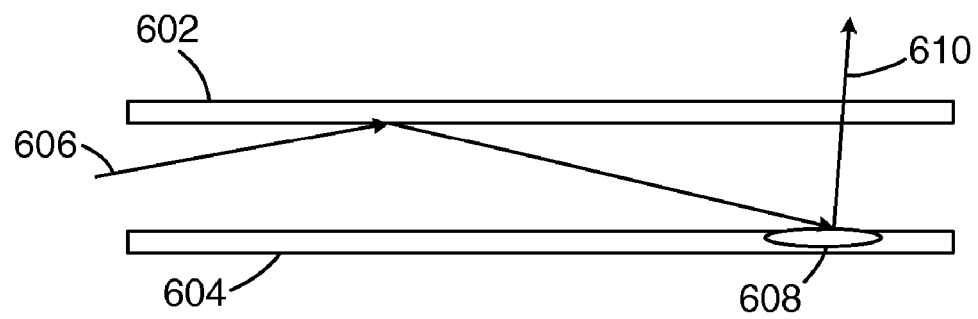
FIGS. 6A-6C schematically illustrate the extraction of light from different fluted light guides.

Different approaches may be used to extract light from the flutes towards the display panel. FIG. 6A schematically illustrates a cross-section along a flute of the fluted light guide, showing the upper and lower layers 602, 604. Light 606 propagating along the flute is reflected off the first layer 602 and the second layer 604. At some areas, the second layer 604 may be provided with an extraction feature 608, in other words the second layer 604 is treated in some way so that the light 606 is reflected in a non-specular manner. The extraction feature 608 may be, for example, a roughened surface or the like. Some of the light 610 is directed by the extraction feature 608 through the first layer 602 towards the display panel.

Figure 6B:
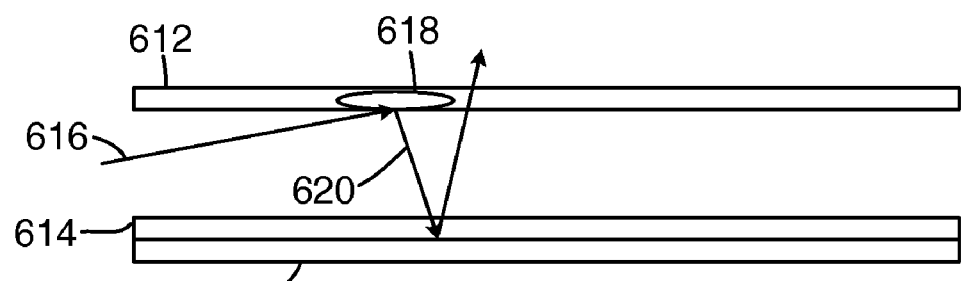

Another approach to extracting the light from the fluted light guide is schematically illustrated in FIG. 6B, which shows a cross-section along a flute of a fluted light guide that has first and second layers 612 and 614. At some areas, the first layer 612 may be provided with an extraction feature 618, in other words the first layer 612 is treated in some way so that the light 616 is reflected by the first layer 612 in a non-specular manner. The extraction feature 618 may be, for example, a roughened surface or the like. Some of the light 620 is directed by the extraction feature 618 towards the second layer 614, where it is reflected, for example by the second layer 614 or by an optional reflecting layer 622, through the first layer 612.

Extraction features may be provided on both the first and second layers of the fluted light guide. In addition, the density of extraction features may be varied along the length of the flute, so that the fraction of light extracted close to the light sources is lower than the fraction of light extracted further away from the light sources. This reduces the amount of light extracted at a point in the light guide where the light is brightest, and so the brightness of the light extracted from the light guide becomes more uniform along the length of the flute.

Figure 6C:
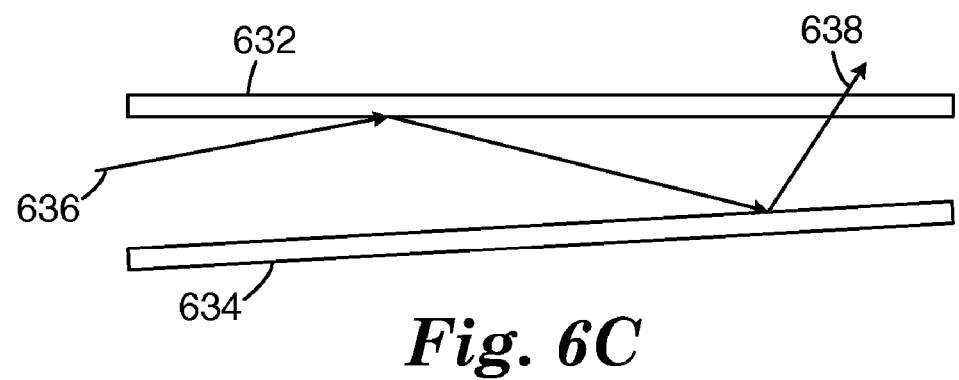

A cross-section of another fluted light guide is schematically illustrated in FIG. 6C. In this light guide, the first surface 632 is not parallel to the second surface 634. As light 636 propagates along this light guide, and is reflected by the first and second layers 632, 634, the direction of propagation becomes closer to a normal to the first layer 632, resulting in a reduction in the angle of incidence. Where the first layer 632 is a dielectric layer, the reflectivity of the first layer 632 becomes lower when the angle of incidence reduces, and so more light 638 passes through the first layer 632.

Figure 7A:
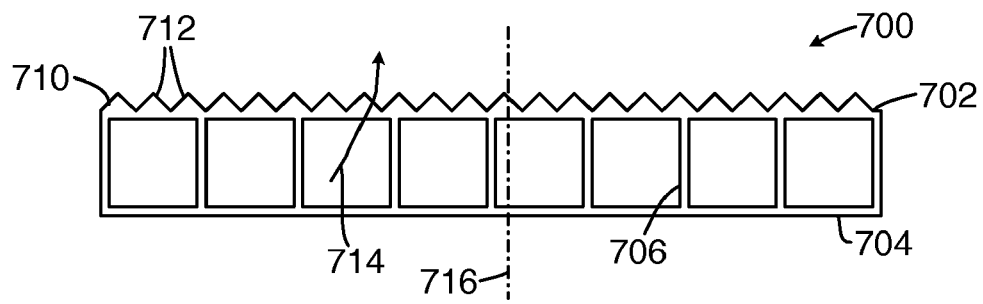
FIGS. 7A and 7B schematically illustrate fluted light guides having a prismatically structured surface.
Figure 7B:
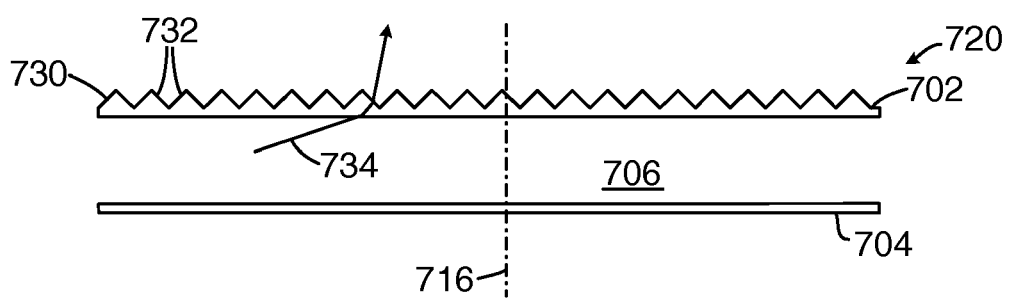

In some embodiments, the surfaces of the first or second layers may be flat, and may be provided with an anti-reflection coating. In other embodiments, the first and/or the second layer may provide some optical function. For example, the outer or inner surface of the first and/or second layers may be provided with a matte finish. In other embodiments, the first and second layers may be provided with some surface structure. For example, the fluted light guide 700 schematically illustrated in FIG. 7A has first and second layers 702, 704 attached together via connecting members 706. In this particular embodiment, the upper surface 710 of the first layer 702 is provided with a series of prismatic ribs 712 that act as collimation features. The ribs 712 may lie parallel to each other, in which case the surface 710 operates like a prismatic brightness enhancing layer, redirecting some off-axis light, exemplified by light ray 714, to propagate in a direction more parallel to the axis 716. In this embodiment, the prismatic ribs lie parallel to the connecting members 706. In another embodiment, schematically illustrated in FIG. 7B showing the cross-section along a flute of a light guide 720, the upper surface 730 may be structured with collimation features such as prismatic ribs 732 that lie perpendicular to the connecting members 706. The light 734 is directed by the structured surface 730 in a direction more parallel to the axis 716. In another embodiment, the structured surface may comprise an array of pyramids rather than ribs.

Figure 8:
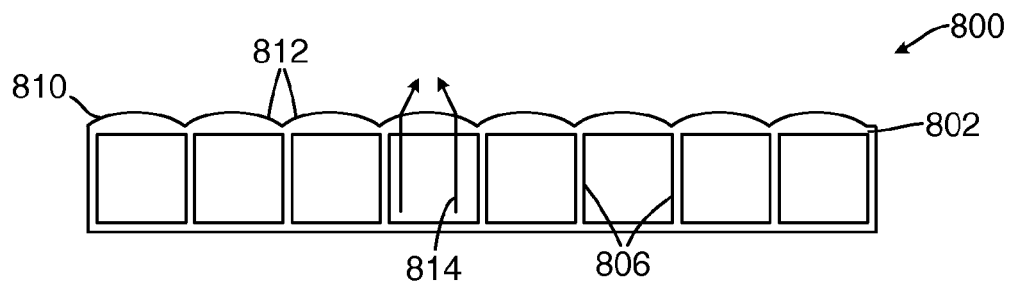
FIG. 8 schematically illustrates a fluted light guide with a lensed surface structure.

The fluted light guide may have other types of surfaces. In another example, schematically illustrated in FIG. 8, the first layer 802 of the fluted light guide 800 has an upper surface 810 that comprises a series of lenses 812 that provide optical power to the light 814 passing through the plate. The lenses 812 may, but are not required to, have a width equal to the spacing between the connecting members 806. The lenses 812 may be lenticular lenses, stretching across the width of the light guide 800.

Figure 9A:
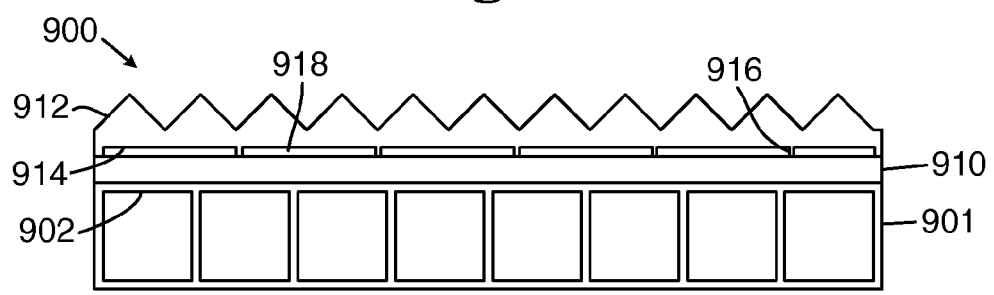
FIGS. 9A-9C schematically illustrate different fluted light guides with attached optical film arrangements.

The fluted light guide may be used for supporting other optical layers in a display. For example, one or more other layers may be attached to the light guide. The following examples are presented to illustrate some possible combinations of other layers with a fluted light guide. FIG. 9A shows an arrangement 900 of optical layers, having a fluted light guide 901 with a reflective polarizer layer 910 attached to the upper surface of the upper layer 902 of the fluted light guide. The reflective polarizer layer 910 may be attached using an adhesive, for example a clear adhesive or an optically diffusing adhesive. A prismatic brightness enhancing layer 912 may be attached above the reflecting polarizer layer 910.

It may be desirable for at least some of the light to enter the brightness enhancing layer 912 through an air interface or an interface going from a low to a high refractive index. Therefore, a layer of low index material, for example a fluorinated polymer, may be placed between the brightness enhancing layer 912 and the next layer below the brightness enhancing layer 912. In other exemplary embodiments, an air gap may be provided between the brightness enhancing layer 912 and the layer below the brightness enhancing layer 912. One approach to providing the air gap is to include a structure on one or both of the opposing faces of the brightness enhancing layer 912 and the layer below the brightness enhancing layer 912. In the illustrated embodiment, the lower surface 914 of the brightness enhancing layer 912 is structured with protrusions 916 that contact the adjacent layer. Voids 918 are thus formed between the protrusions 916, with the result that light entering into the brightness enhancing layer 912 at a position between the protrusions 916 does so through an air interface. In other embodiments, the reflecting polarizer layer 910 may be omitted and the prismatic brightness enhancing layer 912 attached directly to the fluted light guide 901. In some embodiments, the light guide 901 may provide optical diffusion, or a separate diffusing layer may be provided, for example attached to the lower layer 904 of the light guide 901 or attached to the first layer 902 of the light guide 901, between i) the light guide and ii) the reflective polarizer layer 910 and/or the prismatic brightness enhancing layer 912.

Other approaches to forming voids, and thus providing an air interface to light entering the brightness enhancing layer, may be used. For example, the brightness enhancing layer may have a flat lower surface, with the adjacent layer being structured with protrusions. These, and additional approaches, are discussed in U.S. Patent Publication No. 2003/0223216 A1 (Emmons et al.), incorporated herein by reference. Any of the embodiments of a fluted light guide discussed herein may be adapted to provide an air interface for light entering the brightness enhancing layer.

Figure 9B:
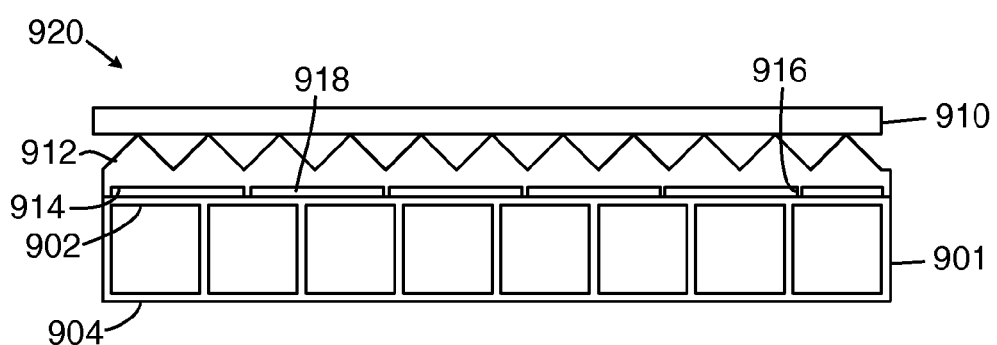

The order of the films attached to the fluted light guide 901 may be different. For example, reflective polarizer layer 910 may be attached to the prismatic surface of the brightness enhancing layer 912, and the brightness enhancing layer 912 can be attached to the fluted light guide 901. This arrangement, labeled 920, is schematically illustrated in FIG. 9B. Attachment of optical films to the prismatic surface of a brightness enhancing layer is further described in U.S. Pat. No. 6,846,089 (Stevenson et al.), incorporated herein by reference.

Figure 9C:
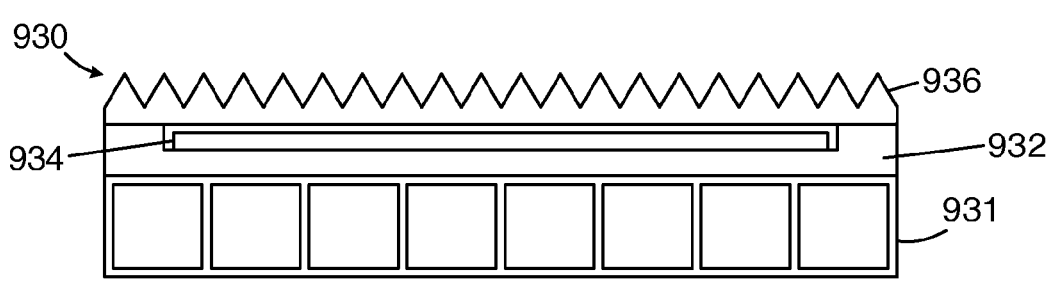

Another arrangement 930 that includes fluted plate 901 attached to various light management films is schematically illustrated in FIG. 9C. In this arrangement 930, a diffuser layer 932 is attached to a fluted light guide 931. An intermediate layer 934 is disposed on the diffuser layer 932 and a prismatic brightness enhancing layer 936 is disposed over the intermediate layer 934. The diffuser layer 932 may be, for example, an acrylic foam tape: the foam tape deforms when the intermediate layer 934 is pushed into the foam tape, creating a recessed region that the intermediate layer resides in. The intermediate layer 934 may have an optical function: for example, the intermediate layer 934 may be a reflective polarizer film. Examples of other suitable arrangements of light management films that may be used with a fluted plate are described in further detail in commonly owned U.S. application Ser. No. 11/244,666 (Gehisen et al.), filed Oct. 6, 2005 and incorporated herein by reference.

Figure 10A:
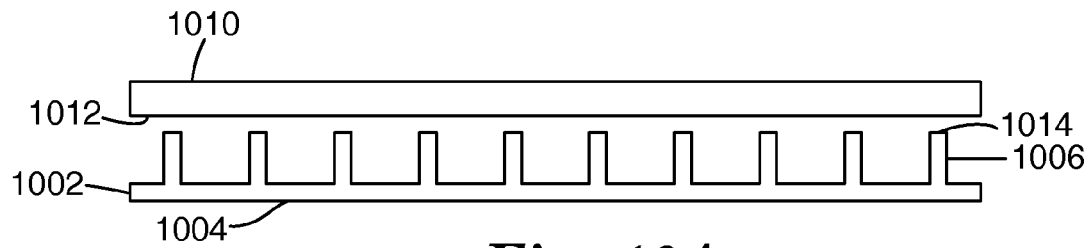
FIGS. 10A and 10B schematically illustrate the construction of a fluted light guide using a spine attached to an optical film.
Figure 10B:
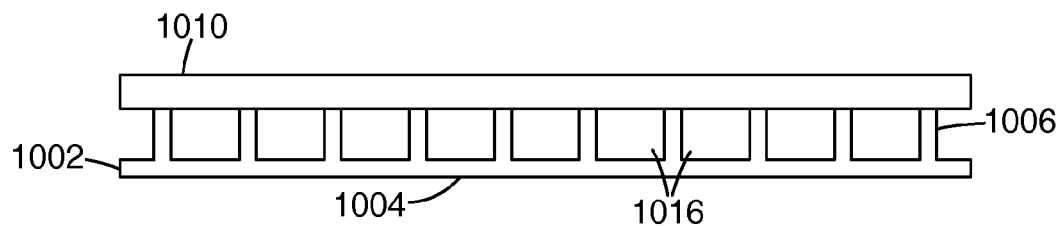

In addition to molding, there exist other methods of manufacturing a fluted light guide. One method is to attach a spine, that has connecting members already applied, to another optical film. This approach is schematically illustrated in FIGS. 10A and 10B. The spine 1002 has a cross member 1004 and an array of connecting members 1006. The connecting members 1006 may be integrated with the cross member 1004. For example, the spine 1002 may be formed by molding or extrusion. The spine 1002 may be formed from the same types of materials as discussed earlier for a fluted light guide. Thus, the spine 1002 may be formed of optically transparent or optically scattering material.

An optical film 1010 is attached to the connecting members 1006. The optical film may be any suitable type of film. For example, the film 1010 may be a prismatic brightness enhancing film, a diffuser film, a reflective polarizer film, a gain diffuser film, a lens film, an absorbing polarizer, a matte film or the like. In addition, the optical film 1010 may simply be a transparent film. Furthermore, optical films may also be attached to the spine 1002 below the cross member 1004.

FIG. 10B shows the optical film 1010 attached to the connecting members 1006. The film 1010 may be attached to the connecting members using any suitable method. For example, the lower surface 1012 of the film 1010 and/or the tips 1014 of the connecting members 1006 may be applied with an adhesive which is cured after the lower surface 1012 and the connecting member tips 1014 are placed in contact. In another approach, in which the film 1010 and connecting members 1006 are both formed of polymeric materials, the film 1010 and connecting members 1006 may be placed in contact before the respective polymeric materials have been fully cross-linked, and the film 1010 and connecting members 1006 are subsequently cross-linked together. Still other approaches may be used, for example contacting the optical film to the molten polymer immediately following extrusion to create a bond between the optical film and the flutes. In another approach, the flutes may be heated, (post extrusion) and laminated at a later time. Also, a coextruded flute may also be employed whereby the flute is formed of one material as the matrix (non adhesive, structural member) with another material coextruded on the tip (adhesive type material).

After the film 1010 has been attached, the film 1010 and spine 1002 together form a fluted light guide with flutes 1016.

Figure 11A:
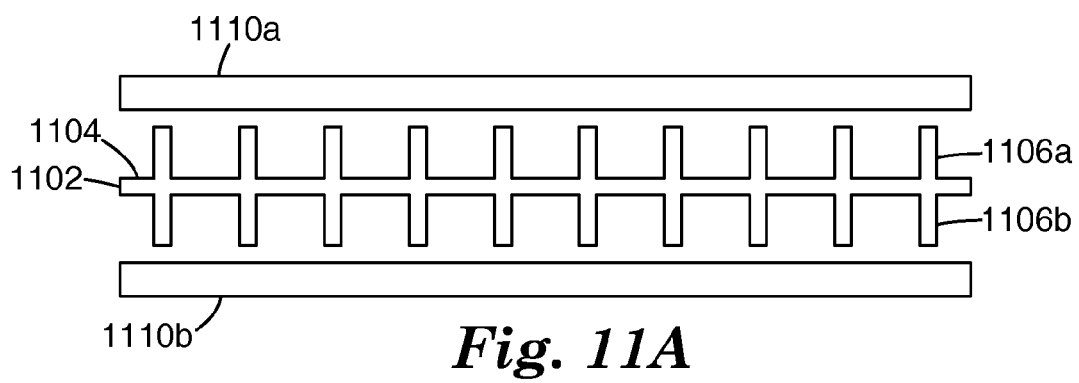
FIGS. 11A and 11B schematically illustrate the construction of a fluted light guide using a double-sided spine attached to optical films.
Figure 11B:
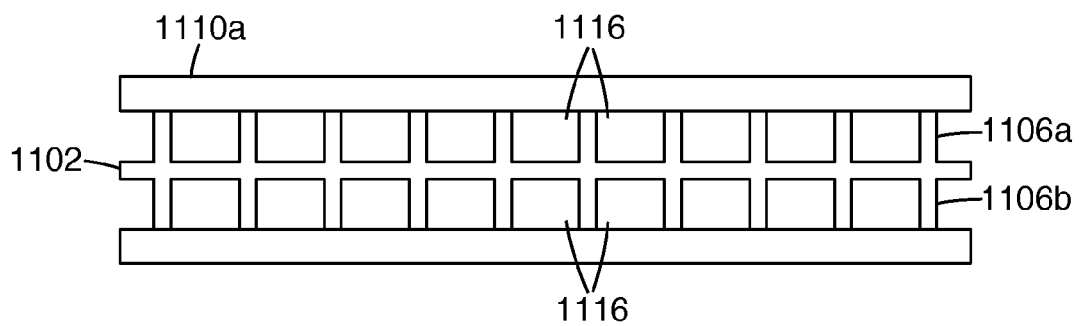

In another embodiment, schematically illustrated in FIGS. 11A (elements separated) and 11B (elements attached together), a spine 1102 has sets of connecting members 1106a, 1106b on respective sides of a cross member 1104. Two optical films 1110a, 1110b may be attached to the respective sets of the connecting members 1106a, 1106b. The optical films 1110a, 1110b may be any desired type of optical film, such as a transparent film, a diffuser film, a prismatic brightness enhancing film, a reflective polarizing film or the like.

After at least one of the films 1110a, 1110b has been attached to the spine 1102, the combination forms a light guide having flutes 1116.

It will be appreciated that there are many different possible arrangement within the scope of the invention, in which different layers appear in different orders from bottom to top of the arrangement, or in different positions relative to the spine.

Figure 12A:
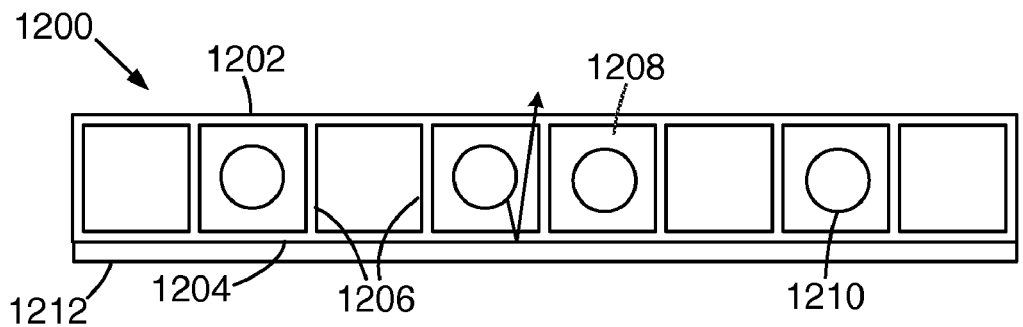
FIGS. 12A and 12B schematically illustrate a fluted light guide that includes integral light sources.
Figure 12B:
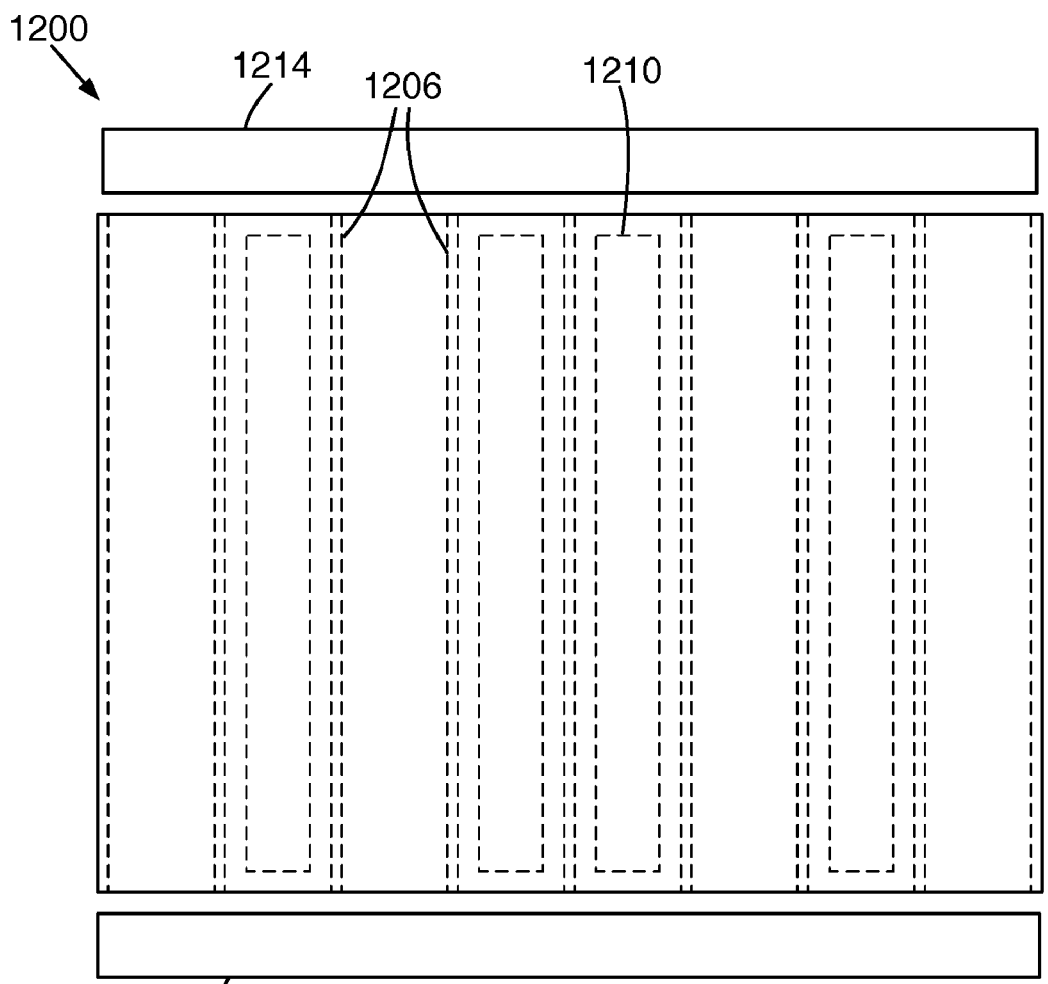

Another embodiment of a fluted light guide 1200 is schematically illustrated in FIGS. 12A and 12B. FIG. 12A shows a cross-sectional view through the fluted light guide 1200 and FIG. 12B shows a top view. In this embodiment, the fluted light guide 1200 includes flutes 1208 formed between a top layer 1202, a bottom layer 1204, and connecting members 1206. One or more light sources 1210, for example CCFLs or LEDs, may be positioned within the flutes 1208. A reflector 1212 may be positioned below the light guide 1200 for reflecting some of the light 1214 from light sources positioned within the flutes 1208. In other embodiments, the bottom layer 1204 itself may be a reflector.

Edge light sources 1216 may also be positioned for directing light along the flutes as described above. The light sources 1210 may be positioned in one, more than one, or all of the flutes 1208. The light sources 1210 may be used, for example, to provide light at areas that otherwise might appear to be darker than other areas. Typically, light from the light sources 1210 is directed through the top layer 1202 for backlighting the display unit. Some other fluted plates that include light sources within the flutes are described further in commonly owned U.S. Patent Application "FLUTED OPTICAL PLATE WITH INTERNAL LIGHT SOURCES AND SYSTEMS USING SAME", and filed on even date herewith.

The cross-sectional shape and/or size of a flute of the fluted light guide need not be constant along the length of the flute. For example, in some embodiments, the cross-sectional shape of a flute may remain constant along its length, while the size varies. In other embodiments, the shape may change, for example a square cross-sectional shape may change into a circular or triangular shape. The cross-sectional shape of the flute may be designed to change in order to spatially vary the light extraction characteristics of the light guide.

Figure 13:
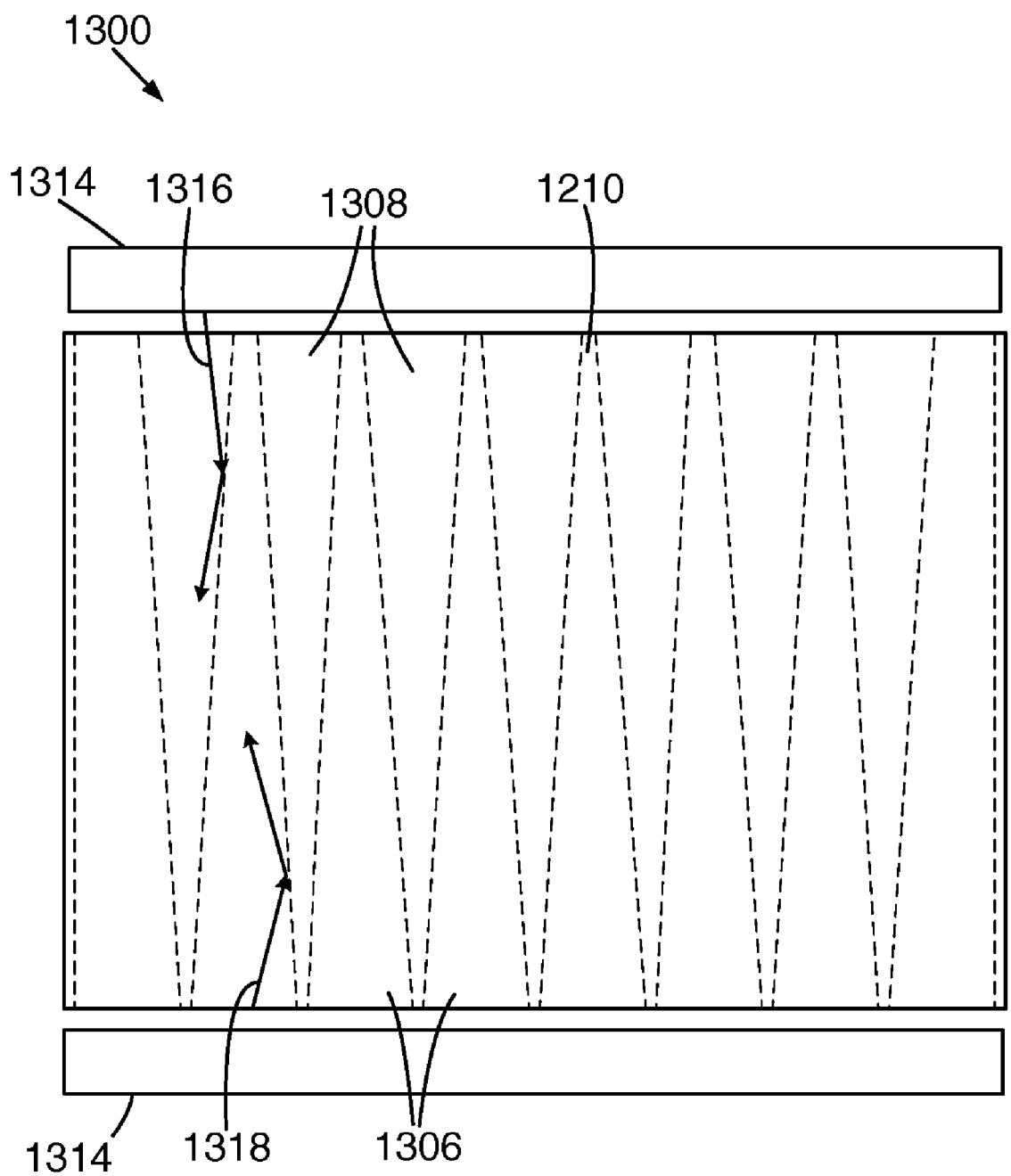
FIG. 13 schematically illustrates a fluted light guide whose flutes have cross-sections that vary along the length of the flutes.

One exemplary embodiment of a fluted light guide 1300 that has flutes whose cross-sectional shape changes is schematically illustrated in FIG. 13. The light guide 1300 has flutes 1308 separated by connecting members 1306. In the illustrated example, the width of the flutes 1308 is greater at the top of the figure and narrower at the bottom of the figure. Also, the width of the connecting members is greater at the bottom of the figure and narrower at the top of the figure. Two light sources 1314 are shown for directing light into the fluted light guide 1300. Some of the light 1316 propagates into the flutes 1308 and may be extracted from the flutes 1308 through the top layer of the light guide 1300.

Other portions of the light 1318 propagate within the connecting members and may totally internally reflect at the surface that interfaces with the flutes 1308. It will be appreciated that some light may propagate within the connecting members of any of the embodiments of fluted light guide described herein. Light may be extracted from within a connecting member using any suitable technique, including techniques used for extracting light from solid light guides.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. For example, free standing optical films may also be used within a display device alongside a fluted light guide that is attached with other optical layers. The claims are intended to cover such modifications and devices.

We claim:

1. A display system, comprising:
    a display panel; and
    a backlight disposed behind the display panel, the backlight comprising a light guide and at least one light source, the light guide comprising a front layer facing the display panel, a back layer facing away from the display panel, an incident edge connecting the front and back layers of the light guide and plurality of connecting members attached to the front and back layers where the upper and lower layers together with the connecting members define a plurality of hollow channels, the hollow channels forming openings arranged along the incident edge of the light guide, and the at least one light source is disposed along the incident edge of the light guide and is perpendicular to the openings directing light into the openings.

2. The system as recited in claim 1, wherein at least one of the front and back layers of the light guide comprises a diffuser layer.

3. The system as recited in claim 2, further comprising at least one light management layer attached to the light guide.

4. The system as recited in claim 3, wherein the at least one light management layer comprises at least one of a reflecting polarizer layer and a prismatic brightness enhancing layer.

5. The system as recited in claim 1, wherein the light guide comprises light extraction features for extracting light out of the light guide towards the display panel.

6. The system as recited in claim 1, wherein at least one of the front and back layers comprises an integral light management layer.

7. The system as recited in claim 6, wherein the integral light management layer comprises one of a prismatic brightness enhancing layer and a reflective polarizer layer.

8. The system as recited in claim 1, further comprising an arrangement of light management layers disposed between the backlight and the display panel, the arrangement of light management layers comprising at least one of a diffuser layer, a reflective polarizer layer, a prismatic brightness enhancement layer and a turning film.

9. The system as recited in claim 8, wherein the at least one of a diffuser layer, reflective polarizer layer and a prismatic brightness enhancement layer is mounted to the light guide.

10. The system as recited in claim 8, wherein the arrangement of light management layers further comprises a fluted plate, at least one of the light management layers being attached to the fluted plate.

11. The system as recited in claim 1, further comprising a controller coupled to control an image displayed by the display panel.

12. The system as recited in claim 11, wherein the controller comprises one of a computer and a television controller.

13. The system as recited in claim 1, wherein the display panel comprises a liquid crystal display (LCD).

14. The system as recited in claim 1, wherein the at least one light source comprises at least one fluorescent lamp or at least one light emitting diode (LED).

15. The system as recited in claim 1, wherein the first and second layers are not mutually parallel.

16. The system as recited in claim 1, wherein the first and second layers are mutually parallel.

17. The system as recited in claim 1, further comprising a reflector layer, the light guide being positioned between the reflector layer and the display panel.

18. The system as recited in claim 17, wherein the reflector layer is attached to the light guide.

19. The system as recited in claim 17, wherein the second layer of the light guide comprises the reflector layer.

20. The system according to claim 1, wherein the light guide is provided with extractors for extracting light from the hollow channels through an upper surface of the light guide towards the display panel.

* * * * *

UNITED STATES PATENT AND TRADEMARK OFFICE
CERTIFICATE OF CORRECTION

PATENT NO. : 7,766,531 B2
APPLICATION NO. : 11/277865
DATED : August 3, 2010
INVENTOR(S) : Susan E Anderson Page 1 of 1

It is certified that error appears in the above-identified patent and that said Letters Patent is hereby corrected as shown below:

Column 2,
Line 8, Delete "surface," and insert -- surface; --, therefor.

Line 30, Delete "failing" and insert -- falling --, therefor.

Column 10,
Line 54, Delete "(Gehisen" and insert -- Gehlsen --, therefor.

Column 12,
Line 5, After "Same"," insert -- having attorney docket no. 61227US002 --.

Signed and Sealed this
Thirty-first Day of May, 2011

David J. Kappos
*Director of the United States Patent and Trademark Office*